Oct. 10, 1950 D. H. HUGHES 2,525,298

RADIO RECEIVER

Filed March 12, 1949

DENIS H. HUGHES Inventor

By Blair & Black

Attorneys

Patented Oct. 10, 1950

2,525,298

UNITED STATES PATENT OFFICE 2,525,298

RADIO RECEIVER

Denis Hawxby Hughes, Cambridge, England, assignor to Pye Limited, Cambridge, England, a British company Application March 12, 1949, Serial No. 81,190
In Great Britain March 16, 1948

4 Claims. (Cl. 250—20)

The invention is concerned with the suppression of interference of an impulsive character in the reception of amplitude-modulated signals.

Known circuits for this purpose employ either a series-connected diode or a shunt-connected diode or a combination of the two. In one type of such circuit, which is non-discriminating with respect to frequency, the maximum amplitude of the interfering pulses is limited to the equivalent of a pre-determined percentage modulation of the received signal, independently of the level of the signal. In another type of circuit, the impulses are differentiated, that is to say subjected to emphasis of the higher frequencies, before limiting and thereafter integrated, to restore the balance of high and low frequencies so that an enhanced reduction of the energy content of the impulses is obtained without significantly depreciating the wanted signals: in the existing arrangements of this type, however, no automatic adjustment is made for different levels of the received signal carrier, and the level at which limiting takes place must be manually adjusted for every level of the received carrier.

According to the present invention, a noise-limiting circuit for apparatus for receiving amplitude modulated signals comprises a noise-limiting rectifier, means for applying a polarising potential dependent on the mean amplitude of a received carrier to said rectifier in such a way that the output is limited in the presence of a signal and interference of which the instantaneous level exceeds a predetermined percentage of the carrier amplitude, said limiting rectifier being fed through means whereby higher frequencies are emphasised and said rectifier being followed if desired, by means for de-emphasising the higher frequencies.

The noise-limiting rectifier, may be connected either in series or in shunt with the signal path, or may comprise a combination of series and shunt rectifiers. The rectifier or rectifiers may be fed through a resistor from the junction point of a divided load resistor and also through a capacitor from the high-potential end of the load resistor, whereby the higher frequencies are emphasised as compared with the lower frequencies before application to the noise-limiting rectifier. A feature of the invention consists in providing a second rectifier connected in opposition to the series-connected noise-limiting rectifier across the feed resistor to the junction point of the divided load resistor in order to remove pulses of reverse polarity to those originally present, produced by the differentiating effect of the resistance-capacitance feed circuit on received impulses.

The present invention also comprises a demodulating and noise-limiting circuit for apparatus for receiving an amplitude-modulated carrier comprising a signal rectifier, a divided load resistor connected to the signal rectifier, a resistance-capacitance network connected across the load resistor to obtain a polarising potential dependent on the mean amplitude of the carrier and a noise-limiting rectifier fed through a resistor from the junction point of the divided load resistor and also fed through a capacitor from the high-potential end of the load resistor, said noise-limiting rectifier having a polarising potential dependent on the mean amplitude of the carrier applied to it, whereby it limits the output in the presence of a signal of which the instantaneous level exceeds a predetermined percentage of the carrier amplitude, said noise-limiting rectifier being followed, if desired, by means for de-emphasising the higher signal frequencies.

The present invention also consists in a noise-limiting circuit for apparatus for receiving amplitude-modulated signals, wherein the amplitude at which the limiting action is brought into effect is responsive to variations in the mean amplitude of a received carrier and wherein higher frequency signals are pre-emphasized before application to the limiter, whereby such higher frequency signals are subjected to limiting at lower percentages of modulation than lower frequency signals, the higher frequency signals being subjected, if desired, to de-emphasis after limiting.

One embodiment of the present invention, as applied to a series-connected noise-limiting circuit, is shown by way of example in the accompanying drawings, in which—

Figure 1:
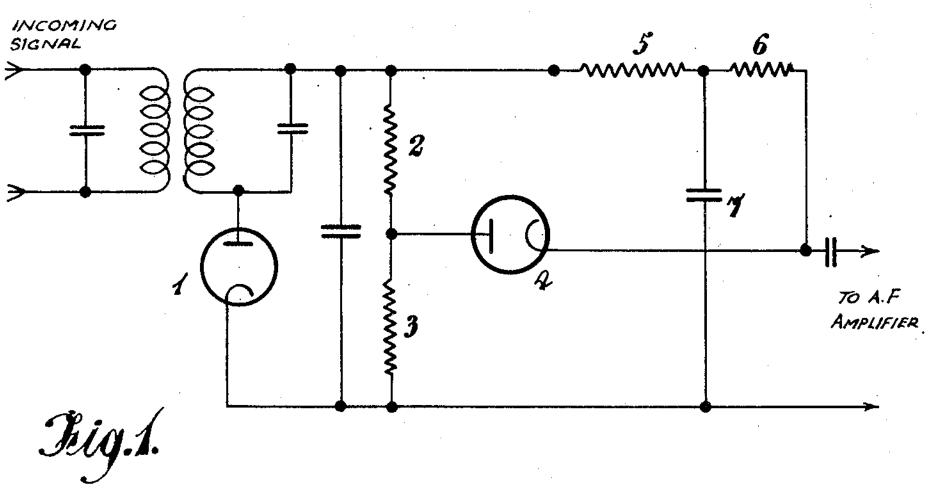
Fig. 1 shows a series-diode noise-limiter circuit of known type.

Fig. 1 shows a typical circuit of the known series diode noise limiter, in which the diode 1 is the signal detector, resistors 2 and 3 form the diode load, and the diode 4 acts as a noise limiter in conjunction with the resistors 5 and 6 and the capacitor 7, the resistor 5 and capacitor 7 having a time constant which is long compared with the period of the lowest audio frequency signal present. A potential dependent on the mean carrier level is developed across the capacitor 7 and this provides a polarising potential which is applied to the diode 4 to render it conductive except in the event of an impulse of greater amplitude than a pre-determined percentage of the mean carrier amplitude being applied to it.

Figure 2:
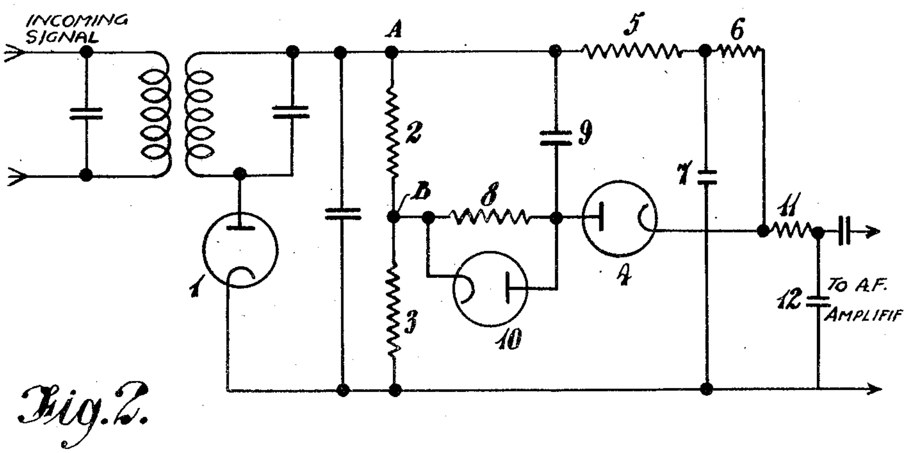
Fig. 2 shows a noise-limiter according to this invention.

Fig. 2 shows the circuit of Fig. 1 modified in accordance with the present invention. Between the tapping B on the load resistor 2, 3 and the anode of the noise limiter diode 4 is connected a resistor 8, and between the high-potential end A of the load resistor 2 and the anode of the diode 4 is connected a capacitor 9. The components 8 and 9 form a differentiating circuit which emphasises the higher frequency components of the desired signal and the impulses. If the impulses be regarded as a Fourier series of audio frequency components, then, since the point A is at a higher signal potential than the point B, higher audio frequency components will be applied to the anode of the diode 4 with less attenuation than lower frequency components. The effect of this is that they will be limited to a lower proportion of their original level by the noise limiter diode 4. Naturally, the same effect also occurs on the higher frequency components of the wanted signal, but, in practice, this is not significant, especially in communication circuits, since the percentage modulation due to the higher frequency components of speech and like signals is normally considerably lower than that due to the lower frequency components. The signals passed on to the audio-frequency amplifier now have their high-frequency components emphasised, and it is, therefore, usually desirable to add an equivalent amount of de-emphasis, for example by the filter 11, 12, to restore the balance to what it would have been in the absence of the circuit 8, 9. Alternatively, such de-emphasis may be provided at a later stage in the audio-frequency amplifier, or it may be omitted. This de-emphasis (or integration) also operates on the impulsive interference, the peaks of which have, however, been cut by the limiting action of the diode 4. Since the energy content of the high audio-frequency components of the impulses forms a considerable proportion of their total energy, the combination of pre-limiter differentiation (high-frequency emphasis) and post-limiter integration (high-frequency de-emphasis) significantly improves the reduction in the energy content of the impulses over that effected by the normal limiter shown in Fig. 1. The purpose of the diode 10 is to remove impulses of reverse polarity formed by differentiation of the received impulses.

It will be clear that the circuit is self-adjusting to suit different levels of received signal carrier in the same manner as the circuit of Fig. 1.

The circuits of Figs. 1 and 2 have been drawn with the diode 1 connected to produce a negative voltage at the point A. The invention is equally applicable if the diode 1 is reversed; the diodes 4 and 10 will in that case also be reversed.

Although one particular embodiment has been described as applied to a series-connected diode noise-limiting circuit, it is to be understood that the present invention is not limited to circuits in which the noise-limiting rectifier is connected in series in the signal path, but that it may alternatively be applied to circuits in which the noise-limiting rectifier is connected in shunt across the signal circuit, so that when the rectifier is caused to conduct by the incidence of noise of amplitude greater than the pre-determined percentage of the mean carrier amplitude, it operates to mute this signal. Again, the invention may be applied to circuits in which a combination of series and shunt-connected noise-limiting rectifiers is employed.

Although the use of thermionic diode rectifiers has been described in the specific embodiment it is to be understood that other types of rectifiers may be used.

I claim:

1. A demodulating and noise-limiting circuit for apparatus for receiving an amplitude-modulated carrier, comprising an input circuit, a signal rectifier connected to said input circuit, a divided load resistor connected to the signal rectifier, a noise-limiting rectifier, a resistor and a capacitor both connected to one terminal of said noise-limiting rectifier and respectively connecting it to the junction point of the divided load resistor and to the high-potential end of the divided load resistor, a further divided resistor connecting said high-potential-end of the load resistor to the other terminal of the noise-limiting rectifier, and a capacitor connecting the junction point of said further divided resistor to the low-potential end of the load resistor for applying a polarising potential to said noise-limiting rectifier to limit the output in the presence of a signal of which the instantaneous level exceeds a predetermined percentage of the carrier amplitude.

2. A demodulating and noise-limiting circuit for apparatus for receiving an amplitude-modulated carrier, comprising an input circuit, a signal rectifier connected to said input circuit, a divided load resistor connected to the signal rectifier, a noise-limiting rectifier, a further resistor and a capacitor both connected to one terminal of said noise-limiting rectifier and respectively connecting it to the junction point of the divided load resistor and to the high-potential end of the divided load resistor a second rectifier of opposite polarity connected in shunt with the further resistor, a further divided resistor connecting said high-potential-end of the load resistor to the other terminal of the noise-limiting rectifier, and a further capacitor connecting the junction point of said further divided resistor to the low-potential end of the load resistor for applying a polarising potential to said noise-limiting rectifier to limit the output in the presence of a signal of which the instantaneous level exceeds a predetermined percentage of the carrier amplitude.

3. A circuit as claimed in claim 2, further comprising means connected to said other terminal of the noise limiting rectifier for de-emphasising higher frequency and thereby balancing the emphasising effect of said capacitor.

4. A demodulating and noise-limiting circuit for apparatus for receiving an amplitude-modulated carrier, comprising an input circuit, a signal rectifier connected to said input circuit, a divided load resistor connected to the signal rectifier, a noise-limiting rectifier, a resistor and a capacitor both connected to one terminal of said noise-limiting rectifier and respectively connecting it to the junction point of the divided load resistor, and to the high-potential end of the divided load resistor, a further divided resistor connecting said high-potential-end of the load resistor to the other terminal of the noise-limiting rectifier, and a capacitor connecting the junction point of said further divided resistor to the low-potential end of the load resistor for applying a polarising potential to said noise-limiting rectifier to limit the output in the presence of a signal of which the instantaneous level exceeds a predetermined percentage of the carrier amplitude, and means for connecting a consumer apparatus between the low-potential end of the load resistor and said other terminal of the noise-reducing rectifier, said means including means for de-emphasising the higher frequencies of the signal.

DENIS HAWXBY HUGHES.

REFERENCES CITED

The following references are of record in the file of this patent:

UNITED STATES PATENTS

| Number | Name | Date |
|---|---|---|
| 2,171,671 | Percival | Sept. 5, 1939 |
| 2,212,832 | Holzer | Aug. 27, 1940 |
| 2,281,395 | Travis | Apr. 28, 1942 |
| 2,345,762 | Martinelli | Apr. 4, 1944 |

FOREIGN PATENTS

| Number | Country | Date |
|---|---|---|
| 198,562 | Switzerland | Sept. 16, 1938 |
| 605,206 | Great Britain | July 19, 1948 |